May 19, 1931. R. F. KOHR 1,806,297
BRAKE
Filed Jan. 16, 1928 2 Sheets-Sheet 1

May 19, 1931.  R. F. KOHR  1,806,297
BRAKE
Filed Jan. 16, 1928  2 Sheets-Sheet 2
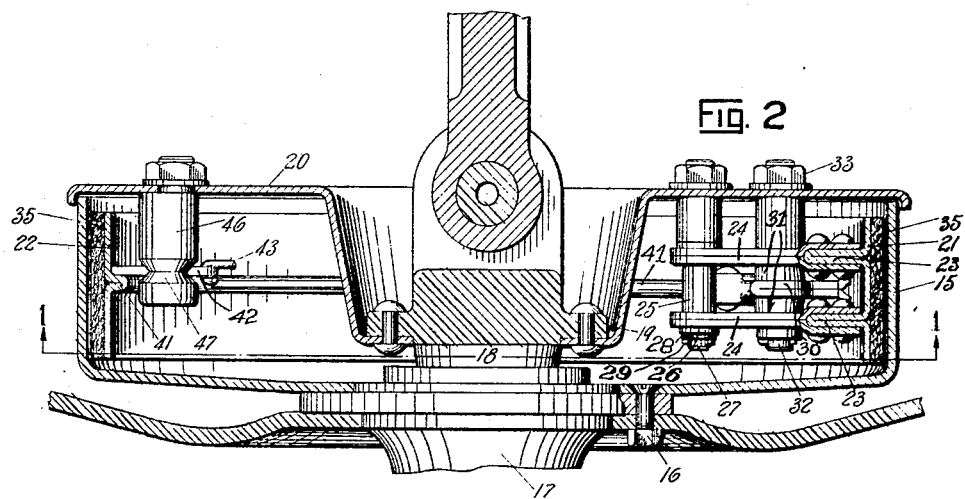
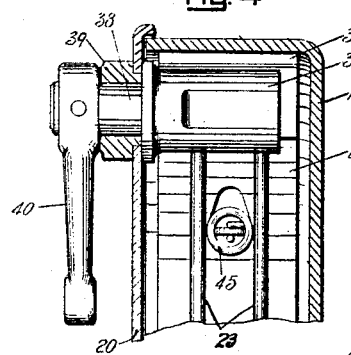
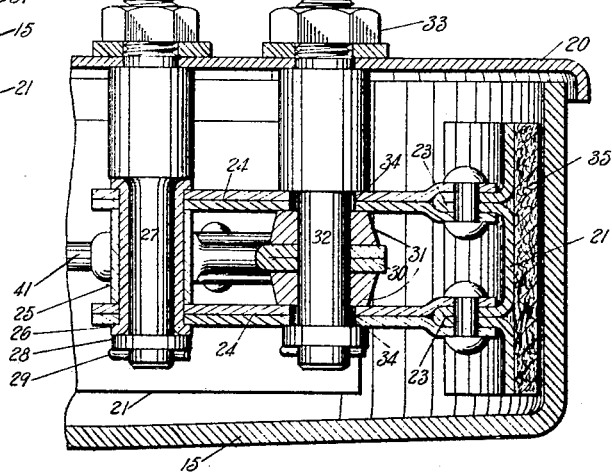
INVENTOR.
Robert F Kohr
BY
P. W. Pomeroy
ATTORNEY Patented May 19, 1931

1,806,297

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed January 16, 1928. Serial No. 247,224.

This invention relates to vehicle brakes and particularly to brakes of the servo type.

Heretofore, it has been the common practice to employ brakes of the servo type which comprised a single flexible band or a plurality of pivoted shoes for the brake element. The constructions employing a plurality of shoes comprises an anchored reverse shoe, a secondary shoe pivotally anchored at one end, and a primary shoe pivoted to the free end of the secondary shoe. The servo shoe first engages the brake drum and then rotates therewith a substantial amount to pivot the secondary shoe about its anchor pin into engagement with the brake drum. These brakes embody a considerable number of parts which are expensive to manufacture and assemble, thereby increasing production costs. The principal object of this invention is, therefore, to provide a brake of the servo type with a brake element, which is simple in design, effective in operation, and very economical to manufacture and assemble.

Another object is to provide a brake of the servo type with a semi-shoe, a portion of which will servo with the brake drum and cause the remainder thereof to engage the brake drum to effect complete braking action.

Another object is to provide a brake of the servo type with a brake element comprising a rigid primary portion and a rigid secondary portion integrally united by a flexible portion, whereby the flexible portion will flex to allow the rigid primary portion to engage the brake drum before the secondary portion, and servo therewith to engage the secondary portion with the brake drum.

A further object is to provide a vehicle brake with a brake element which is flexible at a portion intermediate its ends and which progressively becomes more rigid toward its ends to provide rigid primary and secondary portions connected by an integral flexible intermediate portion.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a section through the vehicle brake taken on the line 1—1 of Figure 2 showing the brake elements in elevation.

Figure 2 is a transverse section of the vehicle brake taken on the line 2—2 of Figure 1, showing the means for centering the brake element transversely of the brake drum.

Figure 3 is an enlarged section taken on the line 3—3 of Figure 1 showing the method of anchoring the brake elements.

Figure 4 is an enlarged section taken on the line 4—4 of Figure 1 showing the operating cam for the brake elements.

Figure 1:
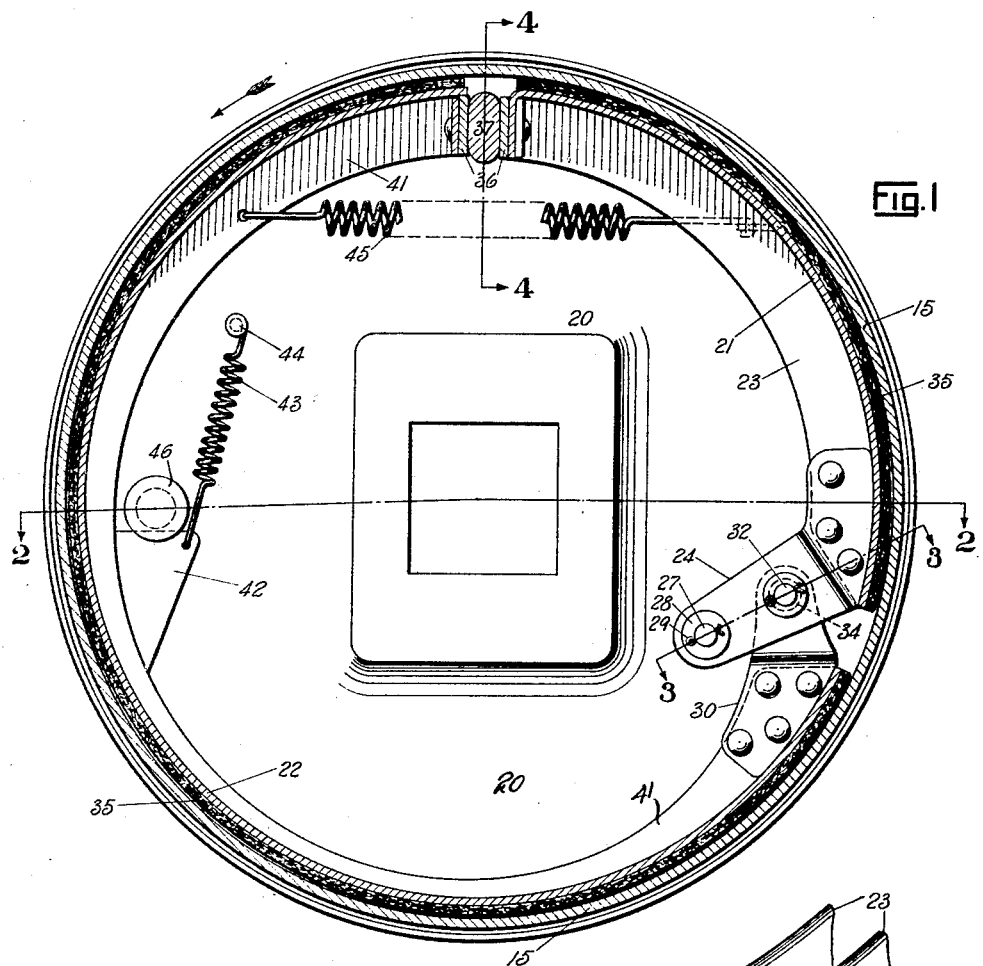
Figures 5, 6:
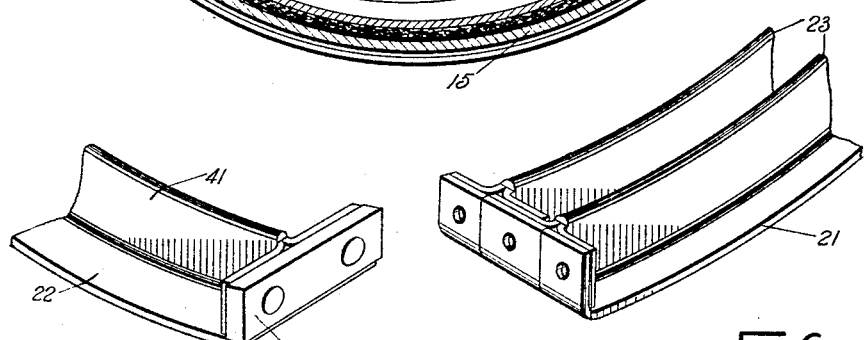
Figure 5 is a perspective view of the cam contact end of the servo element.
Figure 6 is a perspective view of the cam contact end of the reverse shoe.

Referring to the accompanying drawings, in which like numerals refer to like parts throughout the several views, the brake drum 15 is secured by bolts 16 to a wheel hub 17 rotatably mounted upon the steering knuckle 18. A flange 19 is formed on the steering knuckle 18 to which the brake drum dust cover 20 is concentrically secured adjacent to the open end of the brake drum 15.

Within the brake drum 15 are the brake elements and the operating mechanism therefor. The brake elements comprise a reverse shoe 21 and a servo element 22, the reverse shoe 21 being formed from a single sheet metal piece to provide a flat circular surface having a pair of spaced reinforcing webs 23 perpendicular thereto. Anchor brackets 24 having aligned openings are secured to the webs 23 at one end of the shoe 21 and are held in spaced relationship at their free ends by a spacer tube 25, which surrounds a bushing 26 extending through the aligned openings thereof. The shoe 21 is pivotally anchored by an anchor pin 27 secured to the dust cover 20, which pin extends through the bushing 26 in the end of the shoe 21. The pin 27 is shouldered to provide an abutment face for the bushing 26, and the shoe 21 is held against transverse movement by a washer 28 and a key 29 extending through the end of the pin 27.

The brake element 22 has an anchor bracket 30 secured to one end thereof which is positioned between the anchor brackets 24 of the shoe 21, spacer washers 31 being provided to space the same therefrom. An anchor pin 32 secured to the dust cover 20 by a nut 33 extends through enlarged openings 34 in the brackets 24 and through the end of the bracket 30 to pivotally anchor the servo element 22. The openings 34 allow the reverse shoe 21 to pivot about its anchor pin 27. The brackets 24 of the shoe 21 prevent the servo element from moving transversely of the brake drum 15.

Each of the brake elements 21 and 22 is provided with a friction facing 35 and a hardened cam contact plate 36 which bears against one side of the cam member 37. The shaft 38 to which the cam member 37 is secured, extends through a bushing 39 secured to the dust cover 20, and is provided with a rocker arm 40 which is suitably connected to an operating device such as the brake foot pedal or hand lever (not shown).

The brake element 22 is rolled from a single piece of sheet metal to provide a circular flat face having a central reinforcing web 41, and is so rolled that the web 41 varies in depth. The web 41 has its greatest depth at the ends of the brake element and gradually decreases in depth until a minimum is reached approximately at the central portion of the circumference of the brake element 22, as shown in Figure 1. It is evident that the ends of the brake element are very rigid which correspond with the primary and secondary shoes of the conventional servo brake, and that the central portion having the web 41 of minimum depth is flexible, thus providing a flexible connection between the rigid ends which does not have a definite pivotal action. Hereafter, the unanchored end of the brake element 22 will be called the primary or servo portion thereof, and the anchored end will be called the secondary portion.

A flat plate 42 welded or otherwise secured to the side of web 41 of the brake element 22 as shown in Figure 2 extends inwardly, to which one end of a coil spring 43 is attached, the other end being attached to a stud 44 secured to the dust cover 20. The spring 43 normally draws the secondary portion out of engagement with the drum 15. A second coil spring 45 attached at its ends to the free ends of the reverse shoe 21 and brake element 22 draws the same out of engagement with the brake drum 15 and against the sides of the brake cam 37.

The brake element 22 is centered transversely of the drum 15 by means of a cylinder 46 eccentrically mounted on the dust cover 20 and has a groove 47 therein provided with outwardly divergent side walls. The edge of the flat plate 42 seats in the groove 47, the inclined side walls of which cause the brake element to be self-centered transversely of the brake drum 15.

Initial movement of the brake cam member 37 when the drum 15 is rotating in the direction shown in Figure 1, moves the brake element 22 outwardly. As the central part is flexible and because of the tension in the spring 43, the central portion flexes so that only the primary or servo portion first engages the brake drum 15, leaving the secondary portion out of engagement therewith. As soon as the primary portion engages the drum 15, it rotates therewith and because of its rotating movement, causes the secondary portion of the brake element 22 to pivot about its anchor pin 32 and engage the brake drum, whereby, complete braking action is obtained.

It is evident that many advantages are derived by using the servo brake element of the present invention in place of the conventional pivoted primary and secondary shoe construction. In the first place, the brake element 22 is covered with friction facing for substantially its entire length which gives greater braking area. Secondly, continuous flexing of the central portion of the brake element is obtained, whereas in the pivoted shoe construction, only localized bending occurs. That is to say, the division between the secondary and primary shoes in the pivoted shoe construction occurs only at one point. Another important advantage of the present invention is that greater economy is effected in the manufacture and assembly of the brake element. The simplicity of design of the brake element tends toward very economical manufacture as the same can be completely stamped to finished shape in one or two operations. However, it is to be understood that this invention does not lie in the particular method of forming the brake element, and a separate application on that invention is being filed on even date herewith by Donald B. Waite.

Formal changes may be made in the specific embodiment of the invention described without departing from the spirit and substance of the broad invention, the scope of which is commensurate with the appended claims.

What I claim is:

1. In a vehicle brake, a rotatable brake drum, a brake element pivotally supported at one end engageable with said drum comprising rigid end portions integrally connected by a flexible intermediate portion, operating means for moving the free rigid portion into engagement with said drum, and means holding the pivoted portion out of contact with said drum to permit said intermediate portion to flex for allowing said engagement.

2. In a vehicle brake, a rotatable brake drum, a brake element engageable therewith comprising rigid primary and secondary portions integrally connected by a flexible intermediate portion, means pivotally supporting said secondary portion, operating means for moving said primary portion into engagement with said drum, and a spring for holding said secondary portion out of contact with said drum to permit said intermediate portion to flex for allowing said engagement of said primary portion.

3. In a vehicle brake, a rotatable brake drum, a dust cover adjacent to said drum, a brake element engageable with said drum comprising rigid primary and secondary portions integrally connected by a flexible intermediate portion, means pivotally supporting said secondary portion on said dust cover, operating means for moving said primary portion into engagement with said drum, and a spring holding said secondary portion out of contact with said drum during said engagement, said primary portion being rotated with said drum to move said secondary portion into engagement with said drum.

4. In a vehicle brake, a rotatable brake drum, a dust cover adjacent to said drum, forward and reverse elements within said drum each being pivotally supported by said dust cover, said forward element comprising a rigid secondary portion adjacent the pivotally supported end thereof, a primary portion and an integral flexible intermediate portion, spring means normally holding said secondary portion out of engagement with said drum, a spring between the free ends of said primary portion and reverse element normally holding said primary portion out of engagement with said brake drum, and an operating cam rotatably supported by said dust cover for moving said reverse element and said primary portion into engagement with said drum, said primary portion rotating with said drum to move said secondary portion into engagement therewith.

5. In a vehicle brake, a rotatable brake drum, a brake element pivotally supported at one end thereof engageable with said drum, a reinforcing rib for said brake element positioned between the sides thereof, said brake element being flexible intermediate its ends and being progressively more rigid toward its ends, and means for moving the free end of said element into engagement with said drum prior to moving the pivoted end thereof into engagement with said drum.

6. In a vehicle brake, a rotatable brake drum, a brake element engageable therewith having a flat drum engaging surface and a reinforcing rib perpendicular thereto, said rib being flexible intermediate its ends and progressively more rigid toward its end to provide said brake element with rigid primary and secondary portions integrally united by said flexible intermediate portion, means for supporting said secondary portion, and means for moving said primary portion into engagement with said drum prior to moving said secondary portion into engagement therewith.

7. In a vehicle brake, a rotatable brake drum, a dust cover adjacent to said drum, a brake element engageable with said drum having an integral reinforcing rib perpendicular thereto positioned between its sides, said rib being flexible at a portion intermediate its ends and progressively more rigid toward its ends to provide said brake element with rigid primary and secondary portions united by an integral intermediate portion, an anchor pin secured to said dust cover pivotally supporting said secondary portion, and a cam rotatably mounted in said dust cover for moving said primary portion into engagement with said drum for rotation therewith to move said secondary portion into engagement with said drum.

8. In a vehicle brake, a rotatable brake drum, a brake element engageable therewith comprising spaced primary and secondary portions interconnected by a flexible portion, means pivotally supporting said secondary portion, operating means for moving said primary portion into engagement with said drum, and means holding said secondary portion out of contact with said drum to permit said flexible portion to flex for allowing engagement of said primary portion with said drum.

9. In a vehicle brake, a rotatable brake drum, a brake element engageable therewith comprising, rigid end portions and a flexible intermediate portion progressively more rigid toward said end portions, means pivotally supporting one of said end portions, operating means for moving the free end portion into engagement with said drum, and means for causing the free portion to move into engagement with said drum prior to said pivoted end portion.

10. In a vehicle brake, a rotatable brake drum, brake elements movable to engage said drum when the same is moving in either forward or reverse directions, means pivotally supporting each of said elements, one of said elements comprising a rigid secondary portion adjacent to the pivotal supported end thereof, a primary portion and a flexible intermediate portion, means normally holding said secondary portion out of engagement with said drum, and means for moving said elements into engagement with said drum, said primary portion engaging said drum in advance of said secondary portion and rotating with said drum to engage said secondary portion therewith.

11. In a vehicle brake, a rotatable brake drum, forward and reverse braking elements each pivotally supported within said drum, said forward braking element comprising a rigid primary portion, a rigid secondary portion and a flexible intermediate portion, means normally holding said secondary portion out of engagement with said drum, means normally holding said reverse braking element and primary portion out of engagement with said drum, and means operative to move said reverse braking element and said primary portion into engagement with said drum, said primary portion rotating with said drum to move said secondary portion into engagement therewith.

Signed by me at South Bend, Indiana this 11th day of January, 1928.

ROBERT F. KOHR.